(12) United States Patent
Hinojosa et al.

(10) Patent No.: US 10,988,344 B2
(45) Date of Patent: *Apr. 27, 2021

(54) TINSEL SHEATH FOR A CONTINUOUS CABLE IN A CORD REEL SYSTEM

(71) Applicant: Konnectronix, Inc., Waukegan, IL (US)

(72) Inventors: Chris Hinojosa, Winthrop Harbor, IL (US); John Alford, Kenosha, WI (US)

(*) Notice: Subject to any disclaimer, the term of this patent is extended or adjusted under 35 U.S.C. 154(b) by 108 days.

This patent is subject to a terminal disclaimer.

(21) Appl. No.: 16/040,030

(22) Filed: Jul. 19, 2018

(65) Prior Publication Data

US 2019/0256320 A1 Aug. 22, 2019

Related U.S. Application Data

(63) Continuation-in-part of application No. 15/616,647, filed on Jun. 7, 2017, now Pat. No. 10,133,327, which is a continuation-in-part of application No. 15/175,822, filed on Jun. 7, 2016, now Pat. No. 10,145,884.

(60) Provisional application No. 62/346,904, filed on Jun. 7, 2016.

(51) Int. Cl.
| | |
|---|---|
| *B65H 75/40* | (2006.01) |
| *G06F 1/26* | (2006.01) |
| *H02G 11/02* | (2006.01) |
| *B65H 75/48* | (2006.01) |
| *B65H 63/036* | (2006.01) |

(52) U.S. Cl.
CPC ........... *B65H 75/406* (2013.01); *B65H 75/48* (2013.01); *G06F 1/26* (2013.01); *H02G 11/02* (2013.01); *B65H 63/036* (2013.01); *B65H 2701/3919* (2013.01)

(58) Field of Classification Search
CPC .... H02G 11/00; H02G 11/003; H02G 11/006; H02G 11/02; H01B 7/00; H01B 7/0045; H01B 7/02; H01B 7/16; H01B 7/17; H01B 7/18; H01B 11/00; H01B 11/02
See application file for complete search history.

(56) References Cited

U.S. PATENT DOCUMENTS

| | | |
|---|---|---|
| 5,498,940 A | 3/1996 | Kim et al. |
| 9,960,587 B2 * | 5/2018 | Alford ............... B65H 75/4434 |
| 2005/0081410 A1 | 4/2005 | Furem |
| 2013/0112677 A1 | 5/2013 | Christopher |
| 2016/0096440 A1 | 4/2016 | Veiga |

OTHER PUBLICATIONS

Supplementary European Search Report—dated Nov. 29, 2019 Application No. EP17810959.

* cited by examiner

*Primary Examiner* — Robert J McCarry, Jr.
(74) *Attorney, Agent, or Firm* — Vitale, Vickrey, Niro & Gasey

(57) ABSTRACT

A cord reel cable including a cable with tinsel sheath surrounding power and data conductors, wherein the tinsel sheath is comprised of no more than 40 tinsel or tinsel strands, and the cable is wound and unwound around a spool while maintaining continuous electrical contact to a power source through a slip ring mechanism or the like, wherein the tinsel sheath provides a durable EMI shielding to the cable.

8 Claims, 4 Drawing Sheets

TINSEL SHEATH FOR A CONTINUOUS CABLE IN A CORD REEL SYSTEM The present application is a continuation-in-part of application Ser. No. 15/616,647, filed Jun. 7, 2017.

FIELD OF INVENTION

The present invention relates to a system for the retractable delivery of an electrical connection via cord reel. More specifically, the present invention relates to a rectractable cord reel for applications such as in flight entertainment (IFE) and/or communications including a cord reel having multiple groupings of strands, with each grouping surrounded by a non-conductive layer, with an outer layer surrounding a plurality of groupings comprising a limited number (e.g., about 40 strands) of tinsel wrapped around the outside thereof in order to reduce or eliminate electromagnetic interference into or from the cable.

BACKGROUND OF THE INVENTION

Retractable cord reels have been used in various applications to retractably store various types of cables. For example, one successful cord reel assembly has been developed that comprises of a spool on which the extendable portion of cord is held, an expansion chamber in which a fixed length of cable is spirally wound. The two cable portions are connected, typically in or adjacent the hub of the spool. As the spool rotates the spirally wound, fixed cable expands and contracts within the expansion chamber. An example of reels of this type is disclosed in U.S. Pat. No. 5,094,396 to Burke, the disclosures of which are hereby incorporated by reference.

In order to provide a usable product for a variety of operating environments for such cord reels, it is necessary to provide a mechanism to enable the prevention of interference (e.g., EMI/RFI). However, since the kinds of cords reels involved often require repeated winding and unwinding, whatever EMI protection is used needs to be flexible and durable.

DESCRIPTION OF THE PRIOR ART

Those of skill in the art understand that conductive shields (e.g., copper layers) may be used to great success in preventing EMI and cross talk in a cable. For instance, U.S. Pat. No. 7,692,099 (Burke), teaches (among other things) the use of tinned copper shielding comprising 38AWG tinned copper with an inner shield minimum of 90% EMI coverage and an outer shield minimum of 85% coverage. Likewise, such teachings include the use of a copper shield for individual conductors to eliminate crosstalk between such individual conductors in the cable. Such prior art approaches further teach the use of additional layers outside the bundle of conductors to improve durability, such as a further Teflon layer and a braid jacket covering. Such approaches, while useful in a variety of applications, have their limitations. For instance, such shields will have a tendency to "whisker" or fray over time which degrades the effectiveness of the shield. Additionally, the use of multiple layers may limit the flexibility of the resulting cable, depending upon the desired application.

Alternatively, certain prior art references teach the availability of encapsulation techniques for wire assemblies. However, many materials for encapsulation do not have the desired strength and/or flexibility to be employed in a cord reel cable, nor do many materials have the necessary flame, smoke and toxicity resistance required of many cord reel assembly applications.

A separate problem in the field is the ability of durable, flexible shielding to work across a continuous cable connection, e.g., from a connector on the end of a first rectractable cable segment, through the reel and housing assembly, and out a second end that may be fixed (i.e., non-retractable). Prior art approaches include complex cable assemblies with multiple wire components connected to one another, such as the "flat-round" cable assembly referenced above. For instance, in order to enable the manufacture of a "flat-round" cable, it is necessary to have a potting chamber at the point of the flat-round junction, with its attendant increases in the costs of production.

In sum, none of these prior art approaches permit a cord reel assembly to provide a continuous cable including a durable covering for a multi-conductor cable with durability and EMI/crosstalk resistance.

What is needed is a cable assembly with a continuous cable including durable, flexible and EMI/crosstalk resistant solution for the manufacture of a cord reel assembly.

OBJECTS AND SUMMARY OF THE INVENTION

The apparatus and method of the present invention generally includes a cable comprising a bundle of conductors including at least one power conductor, at least one data conductor, each of which are surrounded by separate insulating layers (e.g., polymer layers). The cable further includes a tinsel sheath to cover the conductors, wherein the cord reel includes a slip ring mechanism to counteract the spool rotation mechanism while enabling a continuation electrical contact between the cable segments. The tinsel (i.e., copper with silver plate) sheath element will preferably be comprised of a lesser number of strands (e.g., a range of 30-80, and most preferably no more than about 40 strands, as opposed to 80-160 strand copper compositions in the prior art) that will enable a more durable sheath to operate with sufficient durability without unduly degrading the EMI and cross talk shielding that might be expected from the lesser number of strands.

The tinsel sheath of the present invention, in a preferred embodiment, may be used with a slip ring style connection to enable a counteracting mechanism to offset the rotation of the spool. In such an assembly, the cord reel can provide continuous electrical and/or data transmission between stationary and retractable segments without the need for flat/round cable assemblies as used in the prior art.

The immediate application of a present invention will be seen in flat-round cable assembly, though those of skill will see that the present invention could be applied to other cable assemblies where the complete encapsulation of the cable may not be practical.

Thus can be seen that one object of the present invention is to provide a flexible, durable EMI shield for a cable in a cord reel assembly.

Yet another object of the present invention is to provide a cord reel assembly having superior EMI and crosstalk resistance with a slip ring assembly for continuous data and/or signal transmission.

Still another object of the present invention is to provide a cord reel assembly which reduces or eliminates whiskering or fraying in a cable while still providing acceptable shielding.

It should be noted that not every embodiment of the claimed invention will accomplish each of the objects of the invention set forth above. In addition, further objects of the invention will become apparent based on the summary of the invention, the detailed description of preferred embodiments, and as illustrated in the accompanying drawings. Such objects, features, and advantages of the present invention will become more apparent in light of the following detailed description of a best mode embodiment thereof, and as illustrated in the accompanying drawings.

DETAILED DESCRIPTION OF THE INVENTION

Set forth below is a description of what is currently believed to be the preferred embodiment or best examples of the invention claimed. Future and present alternatives and modifications to this preferred embodiment are contemplated. Any alternatives or modifications which make insubstantial changes in function, in purpose, in structure or in result are intended to be covered by the claims in this patent.

Figure 1:
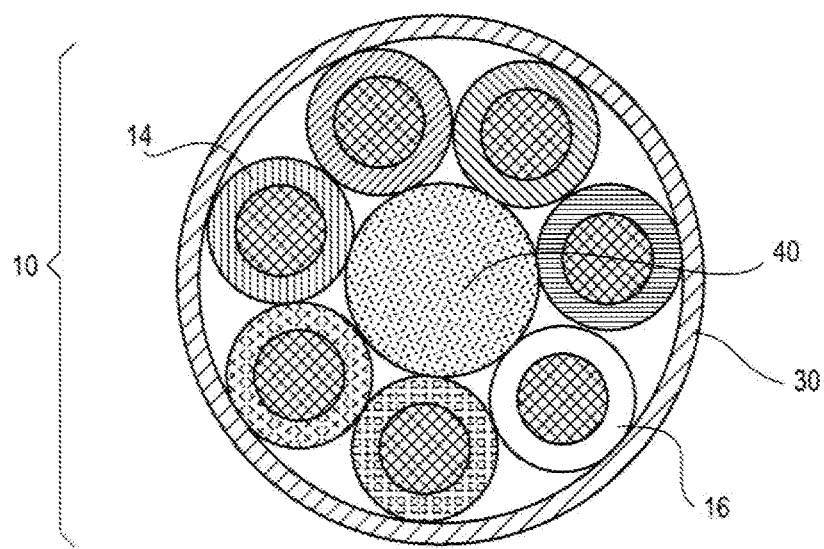
FIG. 1 shows a cross section of a cable in accord with a preferred embodiment of the present invention.

FIG. 1 shows a cable 10 having a cross sectional profile in accord with a first preferred embodiment of the present invention. The cable 10 comprises a series of conductors 12, including at least one power conductor 14 and at least one data wire 16. These conductors 12 are preferably of a thickness or wire gage of 28AWG, and are made of a 19/40 stranded 135 alloy for this preferred embodiment. In addition, all of the conductors 12 of this embodiment preferably include an insulation layer 18 made of 0.006" of ETFE. Preferably, the conductors 12 are twisted or spiral around a cotton core 40 or similar structure to maintain a circular cross section configuration along the length of the cable, so as to make one 360 degree rotation around the core along a given length of the cable (e.g., 1" Lay).

Surrounding the bundle of conductors 12 is an outer sheath 30 made up of a tinsel (i.e., copper with silver, tin or nickel plate) layer to provide a flexible yet strong coverage or shield for the conductors 12. A commercially available example of the outer sheath is sold by IWG High Performance Conductors, Inc., and includes a base textile strand around which is wrapped a silver plated ribbon. The outer sheath 30 is composed of a limited number of such strands, preferably less than 40 strands, though the number of conductors 12 contained in the cable may make a greater or lesser number of strands desirable. In practice, the present invention should employ at least about 30 strands to ensure sufficient EMI coverage, but less than 80 strands.

Figure 2:
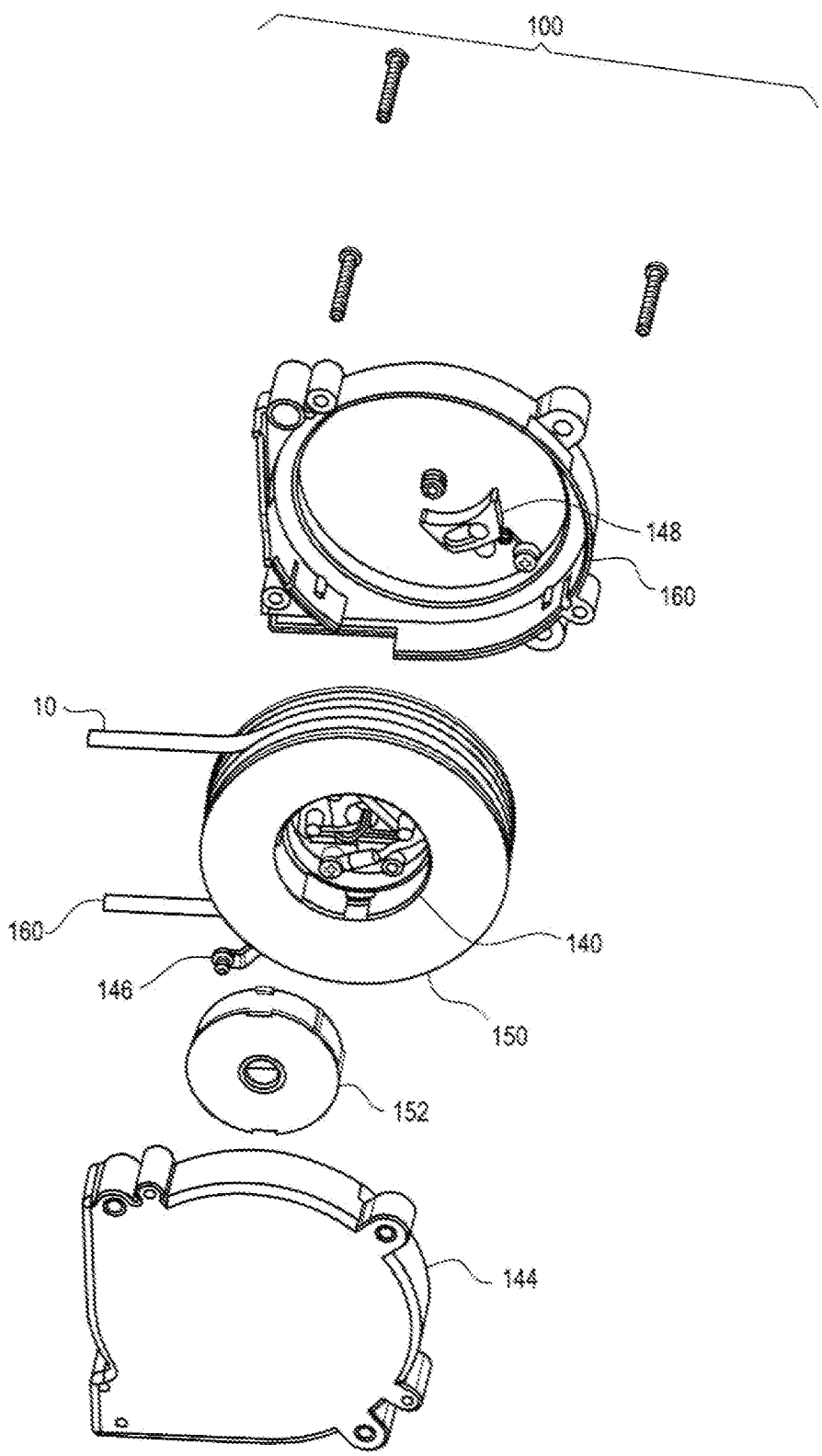
FIG. 2 shows an exploded view of a cord reel assembly in accord with a preferred embodiment of the present invention.
Figure 3:
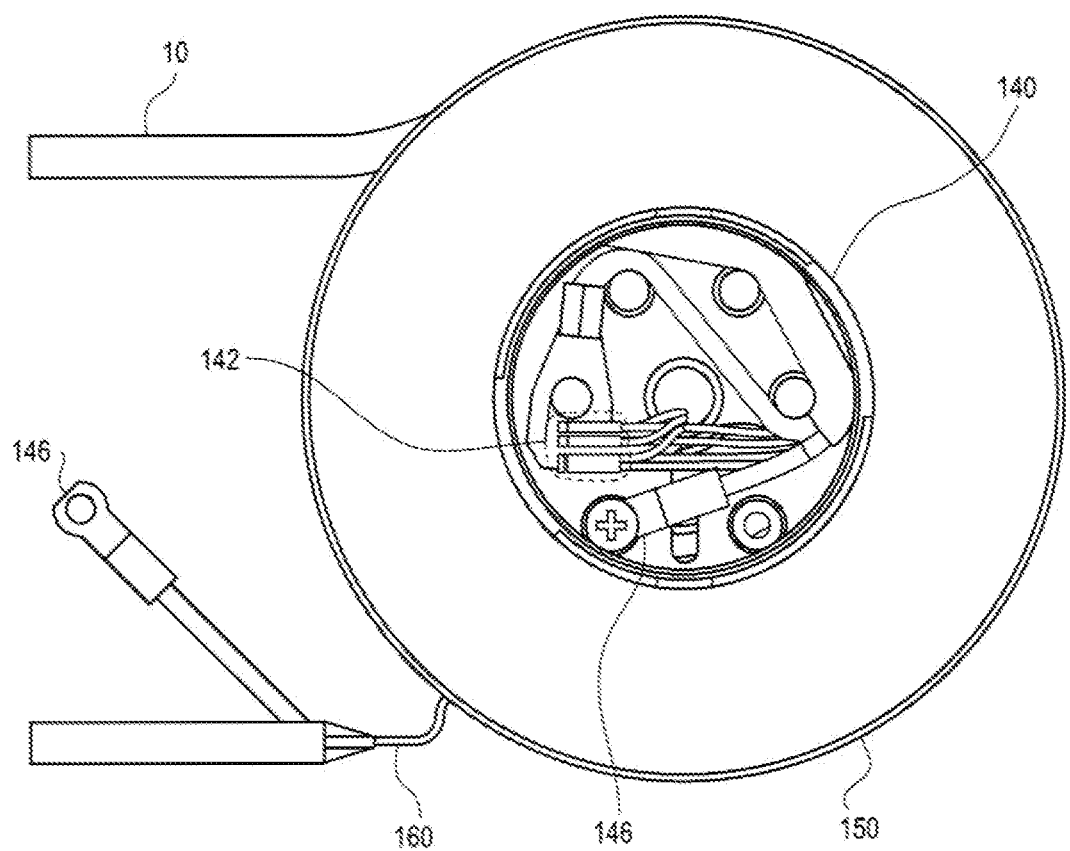
FIG. 3 shows a partially exposed side view of a spool and cable in accord with a preferred embodiment of the present invention.

The present invention can be used in a cord reel assembly 100 as shown in FIG. 2. The cord reel assembly of this example includes a housing 144, a cover 160, and a spool 150. The spool 150 can be controllable wound or unwound through the use of (for example) a ratchet 148, which along with a spring retainer 152 operates to controls the mechanics of winding and unwinding the cord reel. In this embodiment, the cable 10 is a round cable which terminates at one end inside the inner connection chamber 140 located inside of the spool 150 in order to connect to a further cable or electrical connection (such as a flat cable 160). The inner connection chamber 140 of this example embodiment is detailed further in FIG. 3, which includes a splice 142 for connecting the cable and the flat cable 160.

Figure 4:
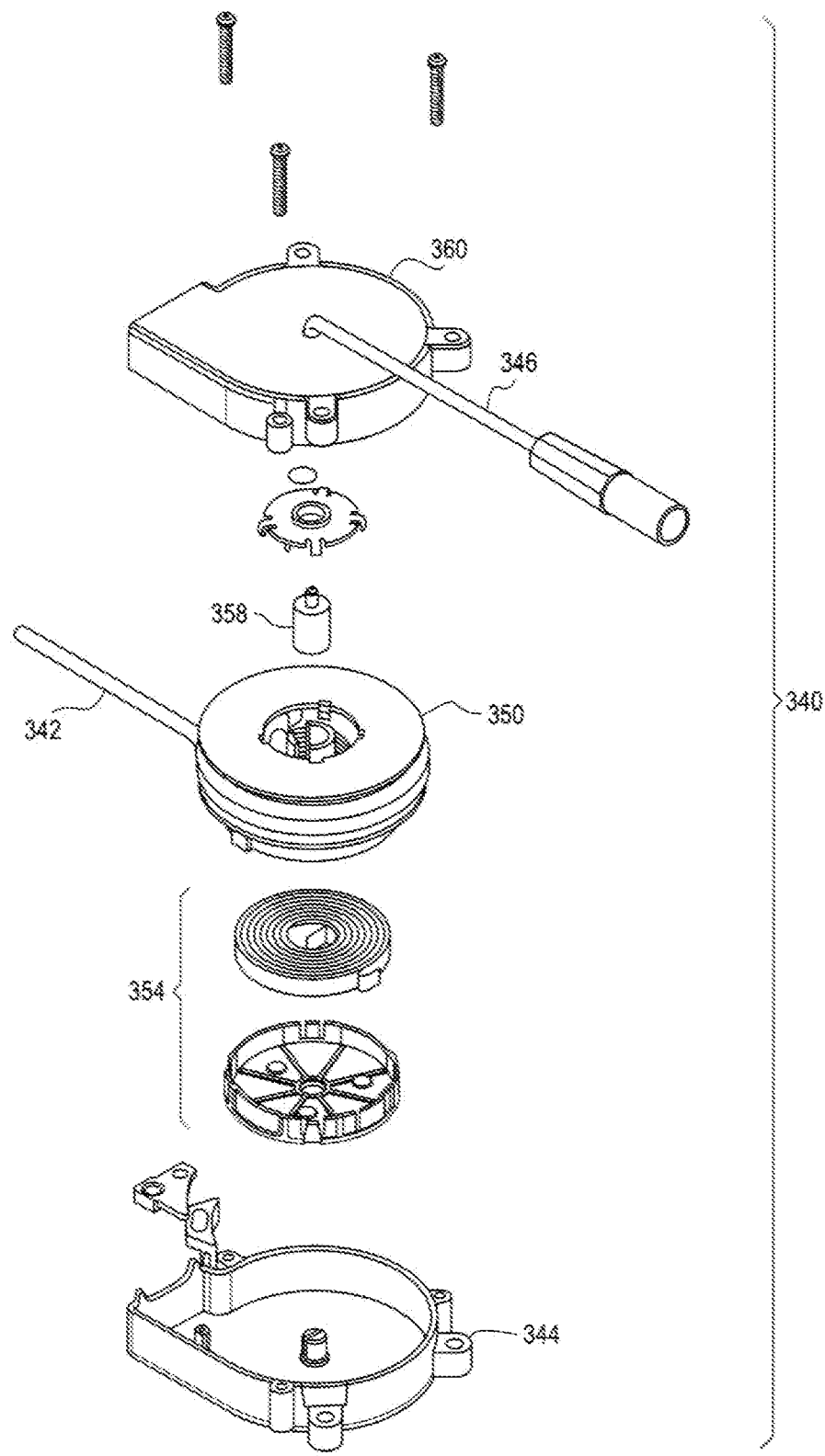
FIG. 4 shows a slip ring mechanism employed with an alternative embodiment of the present invention.

Further, it can be seen that another preferred alternative embodiments of the cord reel unit may be used in the present invention. For instance, as shown in FIG. 4, the present invention can include a cord reel assembly 340 comprising a housing 344 and a cover 360 for retaining and extending a retractable cable 342 around a spool 350. The cord reel unit may optionally include a ratchet mechanism 348 for limiting the retractable movement of the retractable cable 342. The cord reel unit 340 enables transmission of power, electrical and/or optical signals from the retractable cable 342 to the stationary cable 346 via a slip ring mechanism (which can, alternatively, comprise a ball seal mechanism). The slip ring mechanism in this embodiment comprises an inner slip ring 358 which rotatably and substantially continuously contacts the outer slip ring 354 for transmitting between the stationary cable 146 and the retractable cable 342. This alternative embodiment is preferred insofar as it enables the elimination of a flat cable segment for the stationary cable through the use of the slip ring to counter the rotations due to winding and unwinding of the spool 350.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. For instance, the specific wire gages used in the examples of the preferred embodiments of present invention is for illustrative purposes with reference to the example drawings only. Similarly, while the preferred embodiments of the present invention are focused upon use within a cord reel assembly, those of skill in the art will understand that the invention has equal applicability to multi-conductor cables which cannot be completely encapsulated but still required EMI and cross talk resistance. Likewise, it will be appreciated by those skilled in the art that various changes, additions, omissions, and modifications can be made to the illustrated embodiments without departing from the spirit of the present invention. All such modifications and changes are intended to be covered by the following claims.

What is claimed is:

1. A cable for a retractable connection to an electronic device for in-flight entertainment, wherein the cable is retractable into and extendable from a housing including the spool, the cable comprising:
   a) a plurality of electrical conductors, the electrical conductors including at least one conductor for transmitting power to an electronic device to be detachably connected to an end of the cable;
   b) a plurality of non-conductive polymeric layers, each of the plurality of electrical conductors being adjacent to and surrounded by at least one of the non-conductive polymeric layers, wherein the non-conductive polymeric layer surrounds the entire length of each of the plurality of electrical conductors; and
   c) a tinsel outer layer comprised of a range between 30 and 80 tinsel strands surrounding the plurality of non-conductive polymeric layers, the tinsel outer layer providing an outer sheath for the cable.

2. The cable of claim 1, wherein at least one of the plurality of electrical conductors transmits data to the electronic device to be detachably connected to an end of the cable.

3. The cable of claim 1, wherein the tinsel outer layer comprised of no more than 40 tinsel strands surrounding the plurality of non-conductive polymeric layers.

4. A cable for a retractable connection to an electronic device for in-flight entertainment, wherein the cable is retractable into and extendable from a housing including the spool, the cable comprising:
   a) a plurality of electrical conductors, the electrical conductors including at least one of the electrical conductors transmits data to the electronic device to be detachably connected to an end of the cable;
   b) a plurality of non-conductive polymeric layers, each of the plurality of electrical conductors being adjacent to and surrounding at least one of electrical conductors, wherein the non-conductive polymeric layer surrounds the entire length of each of the plurality of electrical conductors; and
   c) a tinsel outer layer comprised of a range between 30 and 80, the tinsel outer layer surrounding the plurality of non-conductive polymeric layers, the tinsel outer layer providing an outer sheath for the cable.

5. The cable of claim 4, wherein at least one of the plurality of electrical conductors transmits power to the electronic device to be detachably connected to an end of the cable.

6. The cable of claim 4, wherein the tinsel outer layer comprised of no more than 40 tinsel strands surrounding the plurality of non-conductive polymeric layers.

7. A cord reel assembly comprising:
   a) a housing,
   b) a spool located within the housing;
   c) a first cable segment for winding and unwinding around the spool, and a second, stationary cable segment for connection to an electrical power source, the first cable segment having a substantially round cross-sectional profile comprising:
      i) at least one data conductor;
      ii) at least one power conductor;
      iii) a non-conductive polymeric layer surrounding the at least one data conductor and a separate, second non-conductive polymeric layer surrounding the at least one power conductor, wherein the non-conductive polymeric layer extends substantially along the entire length of the at least one cable; and
      iv) a tinsel outer shield surrounding the non-conductive polymeric layer and the second non-conductive polymeric layer, the tinsel outer layer providing an outer sheath for the cable.

8. The cable of claim 7, wherein the cord reel assembly further includes a slip ring mechanism connected to the housing for enabling the first cable segment to maintain in substantially continuous electrical contact with the second, stationary cable segment while winding and unwinding around the spool.

\* \* \* \* \*

UNITED STATES PATENT AND TRADEMARK OFFICE
CERTIFICATE OF CORRECTION

| | | |
|---|---|---|
| PATENT NO. | : 10,988,344 B2 | Page 1 of 1 |
| APPLICATION NO. | : 16/040030 | |
| DATED | : April 27, 2021 | |
| INVENTOR(S) | : Hinojosa et al. | |

It is certified that error appears in the above-identified patent and that said Letters Patent is hereby corrected as shown below:

On the Title Page

Item (73) please add:
--(73) Assignee: Konnectronix, Inc., Waukegan, IL (US)--

Signed and Sealed this
First Day of June, 2021

Drew Hirshfeld
*Performing the Functions and Duties of the
Under Secretary of Commerce for Intellectual Property and
Director of the United States Patent and Trademark Office*